United States Patent [19]

Akasaka et al.

[11] Patent Number: 5,182,978
[45] Date of Patent: Feb. 2, 1993

[54] BENT AXIS TYPE VARIABLE DISPLACEMENT HYDRAULIC MACHINE

[75] Inventors: Yoshimichi Akasaka, Tsuchiura; Ichiro Nakamura, Katsuta; Yasuharu Gotoh, Tsuchiura, all of Japan

[73] Assignee: Hitachi Construction Machinery Co., Ltd., Tokyo, Japan

[21] Appl. No.: 460,066

[22] PCT Filed: Oct. 3, 1989

[86] PCT No.: PCT/JP89/01007
§ 371 Date: Jan. 30, 1990
§ 102(e) Date: Jan. 30, 1990

[87] PCT Pub. No.: WO90/04101
PCT Pub. Date: Apr. 19, 1990

[30] Foreign Application Priority Data

Oct. 3, 1988 [JP] Japan ............... 63-249559

[51] Int. Cl.⁵ .................................... F01B 13/04
[52] U.S. Cl. ................................ 91/499; 91/504; 91/505
[58] Field of Search ............ 91/499, 504, 505, 506

[56] References Cited

U.S. PATENT DOCUMENTS

| | | | |
|---|---|---|---|
| 2,967,491 | 1/1961 | Wiggermann | 91/505 |
| 3,721,161 | 3/1973 | Bobst | 91/499 |
| 3,779,137 | 12/1973 | Koivunen | 91/489 |
| 4,464,979 | 8/1984 | Forster | 91/499 |
| 4,765,228 | 8/1988 | Wagenseil | 91/499 |
| 4,788,902 | 12/1988 | Akasaka | 91/499 |
| 4,836,693 | 6/1989 | Stroze | 384/121 |

FOREIGN PATENT DOCUMENTS

| | | |
|---|---|---|
| 0257621 | 8/1987 | European Pat. Off. |
| 2815476 | 2/1980 | Fed. Rep. of Germany |
| 2932583 | 2/1981 | Fed. Rep. of Germany |
| 59-213953 | 3/1984 | Japan |
| 1-147169 | 6/1989 | Japan |
| 1301108 | 12/1972 | United Kingdom |

Primary Examiner—Richard A. Bertsch
Assistant Examiner—Peter Korytnyk
Attorney, Agent, or Firm—Antonelli, Terry, Stout & Kraus

[57] ABSTRACT

Described is a bent axis type variable displacement hydraulic machine which is provided with a hydrostatic radial bearing 23 and/or a hydrostatic thrust bearing 28 to support hydraulic reaction forces exerted on a cylinder block 8. The hydraulic machine is arranged to draw out a high oil pressure corresponding to the tilt angle of the cylinder block 8 through a variable throttle means 34, 37, 51 or 54 or through a control valve 77 or 78, and to supply the pressure to the hydrostatic radial or thrust bearing 23 or 28 thereby imparting to a hydrostatic supporting capacity commensurate with the tilt angle of the cylinder block 8 to support a rotational shaft stably while holding oil leaks to a minimum.

10 Claims, 13 Drawing Sheets

BENT AXIS TYPE VARIABLE DISPLACEMENT HYDRAULIC MACHINE

FIELD OF THE INVENTION

This invention relates to a bent axis type variable displacement hydraulic machine which is suitable for use as a hydraulic pump, hydraulic motor or the like, and, more particularly, to a bent axis type variable displacement hydraulic machine adapted to support a rotational shaft by partial and/or total-hydrostatic bearings.

BACKGROUND OF THE INVENTION

Generally, a bent axis type hydraulic machine has the drive disc of a rotational shaft coupled with a cylinder block through pistons which are reciprocally received in the cylinder block. Therefore, when the bent axis type hydraulic machine is used as a hydraulic pump, the hydraulic reaction forces acting on pistons on the high pressure side in the discharge stroke are supported by the rotational shaft through the drive disc. Similarly, when applied as a hydraulic motor, the hydraulic reaction forces acting on pistons on the high pressure side in the suction (feeding) stroke are supported by the rotational shaft through the drive disc.

Accordingly, in a bent axis type hydraulic machine of this type, the rotational shaft is subject to radial and thrust load of the hydraulic reaction forces and therefore it is necessary to hold the rotational shaft in suitable condition for supporting these loads.

In this regard, it has been the general practice in the prior art to resort to the so-called mechanical support type which mechanically supports the rotational shaft rotatably by ball or roller bearings capable of supporting the radial and thrust loads, with the partial hydrostatic support type which mechanically supports either the radial or thrust loads by a roller or ball bearing while supporting the other load hydraulically by a hydrostatic bearing, or the total hydrostatic support type which supports the entire loads hydraulically by hydrostatic bearings.

Of these various shaft supporting means, a hydraulic machine employing a shaft support bearing of the partial hydrostatic type is described in, for example, Japanese Laid-Open Patent Application 60-224981, wherein a rotational shaft is supported by a hydrostatic thrust bearing composed of a stationary bearing and a movable bearing, each movable bearing being provided with springs and an outer ring to counteract the thrust load which acts on the rotational shaft, along with pistons which are located on the side of the outer ring to generate a pressure in the same direction as the springs and to which oil pressure is applied from the high pressure area in the cylinder block.

On the other hand, a hydraulic machine supporting a shaft by total-hydrostatic bearings is described in Japanese Laid-Open Patent Application 59-131776, which is provided with a radial load bearing sleeve and a thrust load bearing plate within a casing, in combination with a drive flange which is movably disposed between the bearing sleeve and the bearing plate to serve also as a drive disc. The one end face of the drive flange is securely connected to a rotational shaft and the other end face is coupled with pistons. Further, pressure chambers, constituting a hydrostatic radial bearing, are defined between the outer peripheral surface of the drive flange and the bearing sleeve, and drive shoes, constituting a hydrostatic thrust bearing, are provided on one end face of the drive flange. The pistons have oil passages bored therein for supplying high pressure oil to the radial and thrust bearings from cylinders in the cylinder block, to thereby hydrostatically support the radial and thrust loads.

In this connection, even if the hydraulic reaction forces which are applied to the rotational shaft through pistons are the same, the resulting radial and thrust loads vary in dependence upon the tilt angle of the cylinder block. More specifically, the radial load $F_R$ and thrust load $F_T$ are expressed as $$\begin{rcases} F_R = F \sin \Theta \\ F_T = F \cos \Theta \end{rcases} \quad (1)$$

where:
F is the hydraulic reaction force by the piston,
$\Theta$ is the angle of inclination or tilt angle,
$F_R$ is the radial load, and
$F_T$ is the thrust load.

When the tilt angle $\Theta$ is minimum, the radial load $F_R$ becomes minimum while the thrust load $F_T$ becomes maximum. On the other hand, when the tilt angle $\Theta$ is maximum, the radial load $F_R$ becomes maximum while the thrust load $F_T$ becomes minimum.

In short, the above-described prior art devices are arranged to directly supply the hydrostatic bearing or bearings with high pressure oil of a certain level which is generated in cylinders on the high pressure side of a cylinder block (a pump) or which is fed to cylinders on the high pressure side (a motor).

In this manner, in spite of the fact that the radial and thrust loads of the hydraulic reaction forces vary in synchronism with variations in tilt angle of the cylinder block, the conventional counterparts have been arranged simply to apply a high oil pressure of a certain level to a hydrostatic bearing. It follows that the hydrostatic bearing has constant characteristics in load supporting capacity, more specifically, in statically hydrodynamic and dynamically hydrodynamic loads supporting capacity, forming an oil film of an increased thickness on the guide surface of the hydrostatic bearing when the load of the hydraulic reaction force is of a light one (i.e., when the hydrostatic bearing capacity is higher than the load of the hydraulic reaction force), balancing the hydrostatic bearing capacity with the load of a hydraulic reaction force in supporting the latter.

The support of this sort has a problem that the thickness of the oil film is increased to an excessive degree. In this connection, it is known that the rate of oil leakage from an oil film formed on a given sliding surface is proportional to the cube of the oil film thickness. An oil film which has an excessively large thickness as mentioned hereinbefore involves a greater rate of oil leakage from the hydrostatic bearing guide surface, which will lead to a problem of increased power loss.

On the other hand, in a case where the tilt angle of the cylinder block is frequently changed during operation of a pump or motor, the support capacities of the hydrostatic thrust and radial bearings are varied each time when the cylinder block is tilted. This will be reflected by degradations in accuracy of the drive disc positioning in the radial and thrust directions, increasing vibrations of the hydraulic machine to such a degree as will hinder stable rotational movements in high speed operation and impair the durability of the machine.

The present invention solves the above-mentioned problems or drawbacks of the prior art, and has as its object the provision of a bent axis type variable displacement hydraulic machine employing a partial and/or total-hydrostatic bearing support which can ensure operations with reduced oil leakage and of high stability and reliability even under conditions involving intermittent or continual changes of the tilt angle of the cylinder block

SUMMARY OF THE INVENTION

In accordance with the present invention, the above-mentioned object is achieved by a bent axis type variable displacement hydraulic machine including a variable throttle means positioned between a head casing and a valve plate to draw out therethrough a pressure commensurate with the tilt angle of the cylinder block, for supplying at least one of hydrostatic radial and thrust bearings.

According to an aspect of the invention, the above-mentioned variable throttle means includes an oil groove formed on one of a head casing and a valve plate along and in communication with one of paired suction and discharge passages whichever is on the high pressure side of the head casing or along and in communication with one of paired suction and discharge ports whichever is on the higher pressure side of the valve plate in such a manner as to become deeper at a larger tilt angle, and an oil hole formed on the other one of the head casing and the valve plate in a position opposing the oil groove, drawing through the oil groove or oil hole on the head casing a bearing control pressure which increases with the tilt angle of the valve plate, and supplying the pressure to the hydrostatic radial bearing.

According to another aspect of the invention, the above-mentioned variable throttle means includes an oil groove formed on one of a head casing and valve plate along and in communication with one of paired suction and discharge passages whichever is on the high pressure side of the head casing or along and in communication with one of paired suction and discharge ports whichever is on the high pressure side of the valve plate in such a manner so as to become more shallow at a larger tilt angle, and an oil hole formed on the other one of the head casing and valve plate in a position opposing the oil groove, drawing out through the oil groove or oil hole on the head casing a bearing control pressure which decreases with the angle of inclination of the valve plate, and supplying the pressure to the hydrostatic thrust bearing.

Further, according to the invention, the bent axis type variable displacement hydraulic machine includes a sensor means for detecting the tilt angle of a cylinder block and of a valve plate established by a tilting mechanism, an oil passage for drawing out a pressure from either one of paired suction and discharge passages whichever is on the high pressure side of a head casing and supplying the pressure to at least one of radial and thrust hydrostatic bearings, and a control valve provided within the length of the oil passage for modulating the pressure on the basis of a signal of tilt angle received from the sensor.

The bent axis type variable displacement hydraulic machine of the present invention is applicable as a pump of main hydraulic pressure source in hydraulic systems for construction machines, screwed on mechanisms of rolling mill, seawater hydraulic systems and the like.

With the above-described construction, the discharge pressure of a hydraulic pump or the output pressure of a hydraulic motor is supplied to a hydrostatic bearing through the variable throttle means or control valve which modulates the pressure into a bearing control pressure commensurate with the tilt angle.

Consequently, when the hydrostatic bearing is a radial bearing, a bearing control pressure is generated which increases with an increase in tilt angle of the cylinder block to thereby support the radial load exerted on the drive disc by the hydraulic reaction force. On the other hand, in case the hydrostatic bearing is a thrust bearing, a bearing control pressure is generated which is reduced with an increase in tilt angle of the cylinder block to thereby support the thrust load acting on the drive disc.

Thus, it becomes possible to stably support the radial and/or thrust load which varies with the angle of inclination of the cylinder block, prevent unstable vibrations of the rotational shaft and drive disc and maintain the positioning accuracy of the drive disc in the radial and thrust directions irrespective of variations in the tilt angle, while permitting a reduction of the rate of oil leakage from the hydrostatic bearing guide surface.

BEST MODE FOR CARRYING OUT THE INVENTION

Figure 1:
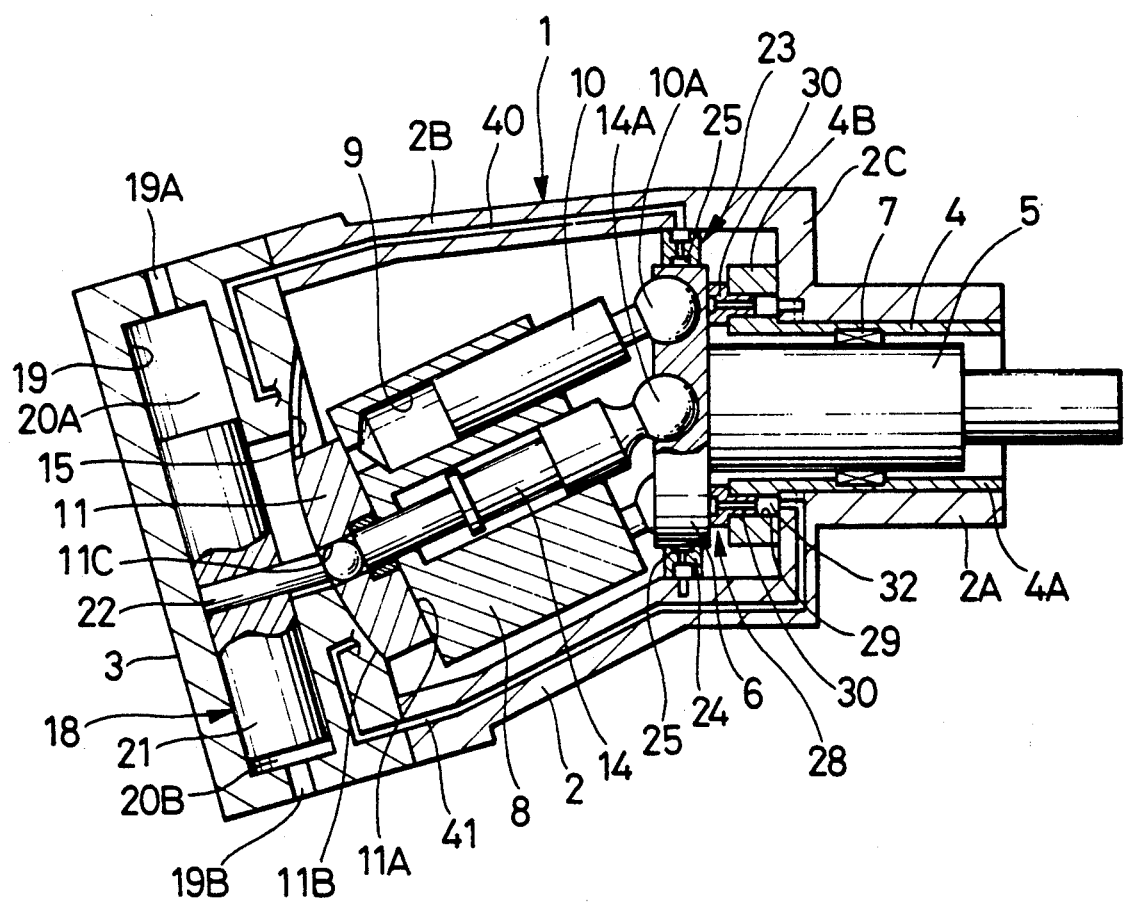
FIG. 1 is a longitudinal cross sectional view of a hydraulic pump constructed in accordance with the present invention.
Figure 2:
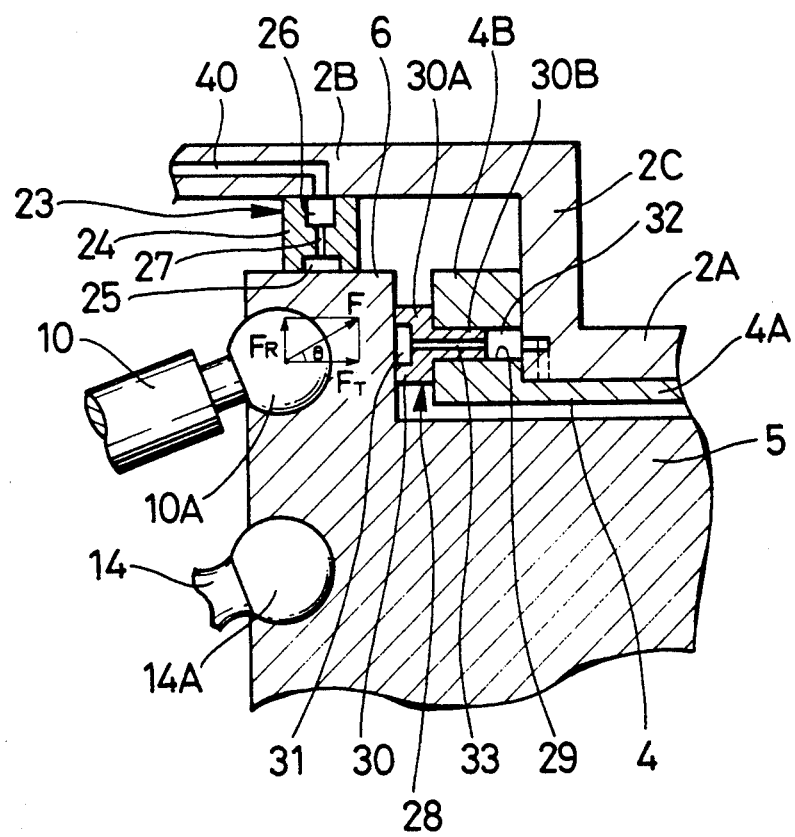
FIG. 2 is a cross-sectional view, on an enlarged scale, of a component of the pump of FIG. 1.

Referring now to the drawings wherein like reference numerals are used throughout the various views to designate like parts and, more particularly, to FIGS. 1–9, according to these figures, a variable displacement hydraulic pump, constructed in accordance with the present invention, includes a casing generally designated by the reference numeral 1 comprising a casing body 2, bearing portion 2A, a larger diameter tilted cylindrical portion 2B, and a head casing 3 closing an open outer end of the tilted cylindrical portion 2B of the casing body 2.

A bearing sleeve 4 is provided in the bearing portion 2A of the casing 1, with the bearing sleeve 4 including a sleeve portion 4A fitted in the bearing portion 2A, and a flange portion 4B abutted against a stepped wall portion 2C of the tilted cylindrical portion 2B. Inserted into the bearing sleeve 4 from outside of the casing 1 is a rotational shaft 5 which has a large diameter drive disc 6 integrally formed at an inserted inner end which is extended into the tilted cylindrical portion 2B. The rotational shaft 5 is journalled in the bearing sleeve 4 through a bearing 7, while the drive disc 6 is arranged to support hydraulic reaction forces through a hydrostatic radial bearing 23 and a hydrostatic thrust bearing 28 as will be described hereinafter.

A cylinder block 8 is provided within the casing 1 and is integrally rotatable with the rotational shaft 5, with the cylinder block 8 having a plural number of pistons 10 reciprocally received in cylinders 9 axially bored in the cylinder block 8. The pistons 10 are each provided with a spherical portion 10A at a forward end thereof and are pivotally connected with the drive disc 6.

Figure 3:
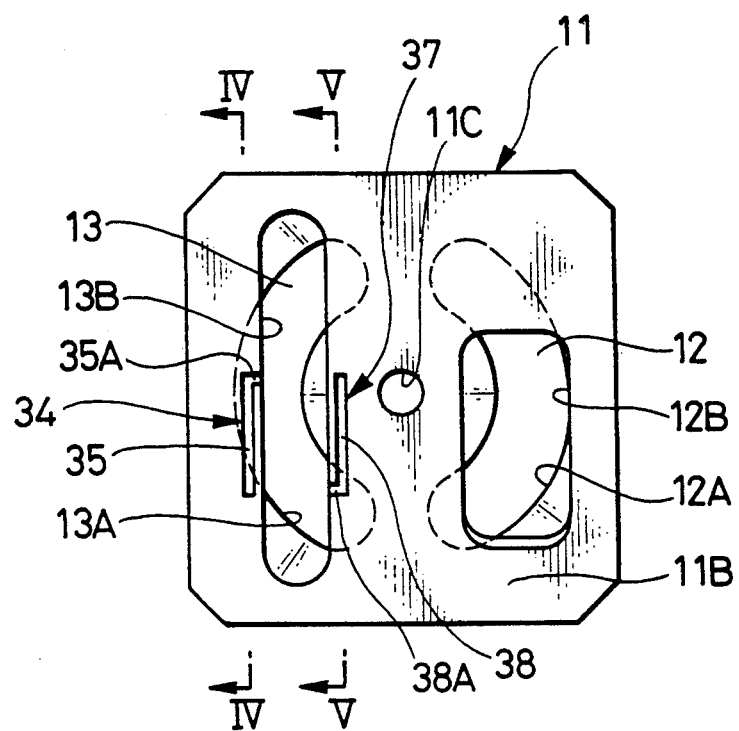
FIG. 3 is a front view of a valve plate, as viewed from a side of a sliding surface of a head casing.

A square valve plate 11 forms, on one side thereof, a flat plate-like switching surface 11A for sliding contact with the opposing end face of the cylinder block 8 and, on the other side thereof, a convex sliding surface 11B for sliding contact with a concave tilting sliding surface 15 formed on the head casing 3 as will be described hereinafter. A pair of suction and discharge ports 12, 13 are bored in the valve plate 11. These ports 12 and 13 form, on the side of the switching surface 11A, an arcuate suction port opening 12A and an arcuate discharge port opening 13A, respectively, which are intermittently communicated with each one of the cylinders 9 by rotation of the cylinder block 8, while respectively forming a rectangular suction port opening 12B and a slot-like discharge port opening 13B on the side of the sliding surface 11B. (FIG. 3.)

A center shaft 14 tiltably supports the cylinder block 8 between the drive disc 6 and the valve plate 11, and has at one end a spherical portion 14A which is pivotally supported in a center position of the drive disc 6. The other end of the center shaft 14, extending through the cylinder block 8, is slidably received in a through hole 11C bored at the center position of the valve plate 11 for centering the cylinder block 8 and the valve plate 11.

Figure 6:
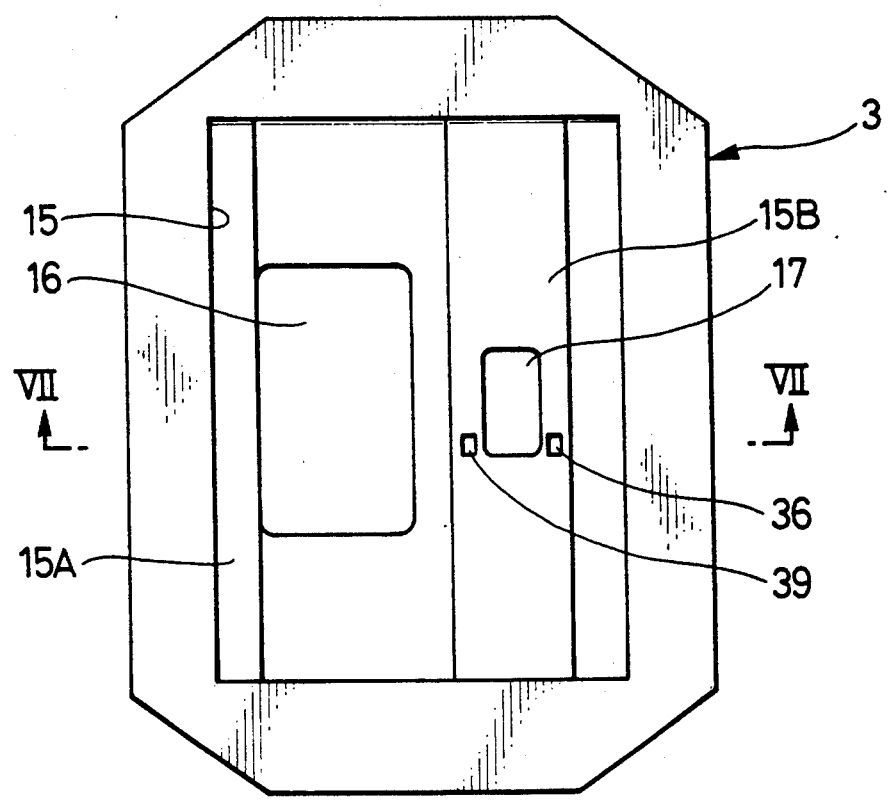
FIG. 6 is a front view of a head casing, as viewed from a side of a tilting sliding surface.
Figure 7:
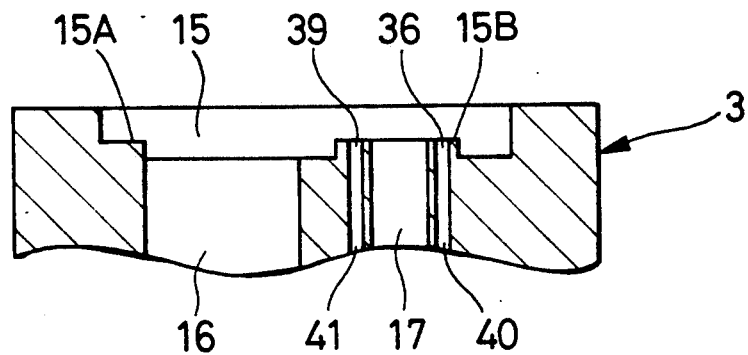
FIG. 7 is a partial cross-sectional view taken along the line VII—VII in FIG. 6.

The head casing 3 is provided with a concave arcuate tilting sliding surface 15 on its inner wall surface, with the tilting slide surface 15 having fluid-tight seal lands 15A and 15B in sliding contact with the sliding surface 11B of the valve plate 11. The head casing 3 is provided with a pair of suction and discharge passages 16, 17, with the suction passage 16 opening into a recess between the seal lands 15A and 15B on the tilting sliding surface 15 for communication with the suction port 12 of the valve plate 11 while the discharge passage 17 opening onto the seal land 15B for communication with the discharge port 13. (FIG. 6.)

A tilting mechanism 18 is mounted in the head casing 3 for tilting the valve plate 11 along the tilting slide surface 15. The tilting mechanism 18 includes a cylinder bore 19 formed in the head casing 3 and has oil passages 19A and 19B at the opposite ends thereof, with a servo piston 21 being slidably fitted in the cylinder bore 19 and defining oil chambers 20A and a rocking pin 22 being fitted in the servo piston 21 and having a spherical portion at its distal end pivotably fitted in the valve plate 11. The oil pressure which is received from an auxiliary pump (not shown) through a tilting control valve is supplied to the oil chamber 20A or 20B through the oil passage 19A or 19B, thereby driving the servo piston 21 to tilt the valve plate 11 and cylinder block 8.

A hydrostatic radial bearing 23 supports the radial load components of the hydraulic reaction forces exerted on the drive disc 6 by pistons. The hydrostatic radial bearing 23 includes a bearing sleeve 24 of a ring-like form located around the drive disc 6 and has an outer periphery thereof fitted in the inclined cylindrical portion 2B of the casing body 2 and the inner periphery disposed in sliding contact with the outer periphery (the hydrostatic bearing guide surface) of the drive disc 6; a plurality of pressure chambers 25, at least three or counting in maximum a number equivalent to the number of the pistons 10) in the form of recesses formed at equidistant positions around the inner periphery of the bearing sleeve 24; supply ports 26 formed on the outer periphery of the bearing sleeve 24 at positions corresponding to the pressure chambers 25; and throttle passages 27 provided between the supply ports 26 and the pressure chambers 25 to control the static pressure in the pressure chambers 25 according to the load condition. The respective supply ports 26 of the hydrostatic radial bearing 23 receive the bearing control pressure, which is increased with the tilt angle as will be described hereinafter, for supporting the radial loads. The supply ports 26 may be substituted by a single annular groove if desired.

A hydrostatic thrust bearing generally designated by the reference numeral 28 supports the thrust load components of the hydraulic reaction forces exerted on the drive disc 6 through the pistons. The hydrostatic thrust bearing 28 includes the bearing sleeve 4; a plurality of axial pad insert holes 29 provided at predetermined intervals around the circumference of a flange portion 4B of the bearing sleeve 4; bearing pads 30 each having a pad portion 30A and a shaft portion 30B smaller than the pad portion in diameter, with the pad portion 30A being held in sliding contact with the back surface (the hydrostatic bearing guide surface) of the drive disc 6, and the shaft portion 30B being inserted in a corresponding one of the pad insert holes 29; pressure chambers 31 in the form of sectionally U-shaped grooves formed on the faces of the respective pad portions 30A on the side of the sliding contact surface of the drive disc 6; supply chambers 32 defined in the pad insert holes 29 by the shaft portions 30B; and throttle passages intercommunicating the supply chambers 32 and the pressure chambers 31. Each supply chamber 32 of the hydrostatic thrust bearing 28 receives the bearing control pressure, which is lowered with the tilt angle as will be described hereinafter, for supporting the thrust loads. It suffices to provide the bearing pads 30 at a number of spaced positions around the flange portion 4B of the bearing sleeve 4.

The variable throttle mechanism which is generally designated by the reference numeral 34 produces the bearing control pressure for the radial hydrostatic bearing 23, and includes an oil groove 35 formed on the sliding surface 11b of the valve plate 11 at a position in the vicinity of and along one side of the discharge opening 13B of the discharge port 13 from a median point toward the lower end of the latter; and an oil hole 36 formed in the seal land 15B in a position at one side of the opening of a discharge passage 17 on the side of the tilting slide surface 15 of the head casing 3 and opposingly to the oil groove 35.

Figure 4:
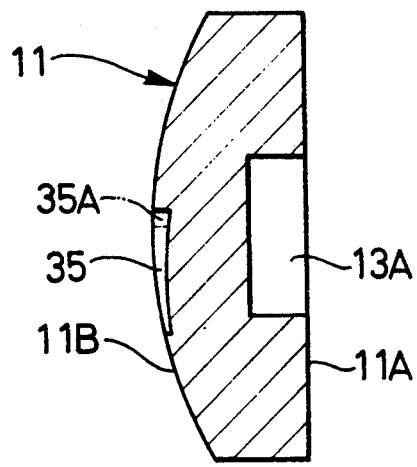
FIG. 4 is a cross-sectional view taken along the line IV—IV in FIG. 3.
Figure 8:
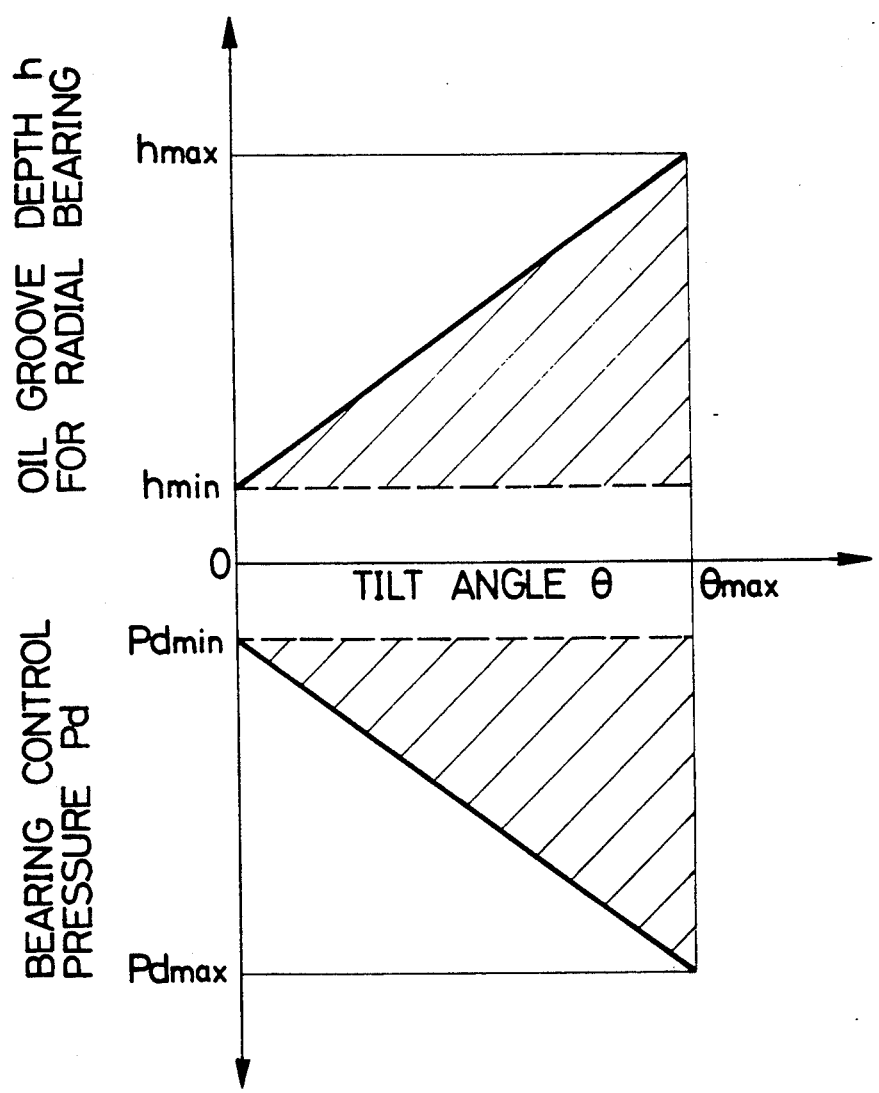
FIG. 8 is a graphical illustration of a relationship between a radial bearing oil groove depth and a bearing control pressure with given tilt angles.

In this instance, as shown particularly in FIGS. 4 and 8, the oil groove 35 is formed in a wedge-like shape having a continuously varying depth h which becomes smallest when the tilt angle $\Theta$ of the valve plate 11 is zero or when $\Theta = 0°$ (with the valve plate 11 in the uppermost position in FIG. 1), and which becomes greatest when the tilt angle $\Theta$ is maximum or when $\Theta = \Theta_{max}$ (the position of FIG. 1). At the deepest end, the oil groove 35 is provided with a groove portion 35A which communicates with the discharge port opening 13B. The oil passage 36 is formed such that it confronts the lower end (the shallowest end) of the oil groove 35 at the minimum tilt angle, and has an open area which produces a maximum discharge pressure $Pd_{max}$ at the maximum tilt angle. Thus, the variable throttle mechanism 34 for the radial bearing is capable of producing a bearing control pressure Pd which has characteristics of increasing in proportion to the tilt angle $\Theta$. (FIG. 8.)

A variable throttle mechanism generally designated by the reference numeral 37 provides a bearing control pressure for the hydrostatic thrust bearing 28, with the variable throttle mechanism 37 including an oil groove 38 formed on the sliding contact surface 11B of the valve plate 11 in the vicinity of and along the other side of the discharge port opening 13B opposingly to the above-mentioned oil groove 35; and an oil hole 39 formed in the seal land 15B on the tilting slide surface 15 of the head casing 3 in a position confronting the oil groove 38 and on one side of the discharge passage 17 away from the oil hole 36.

Figure 5:
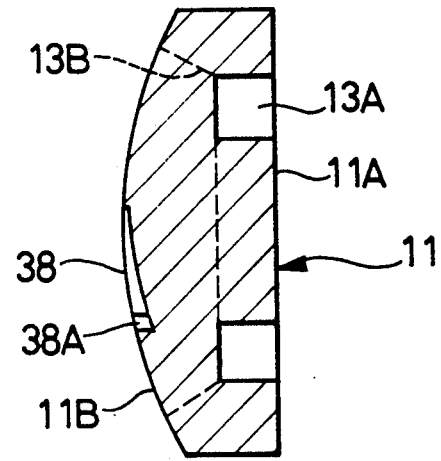
FIG. 5 is a cross-sectional view taken along the line V—V in FIG. 3.
Figure 9:
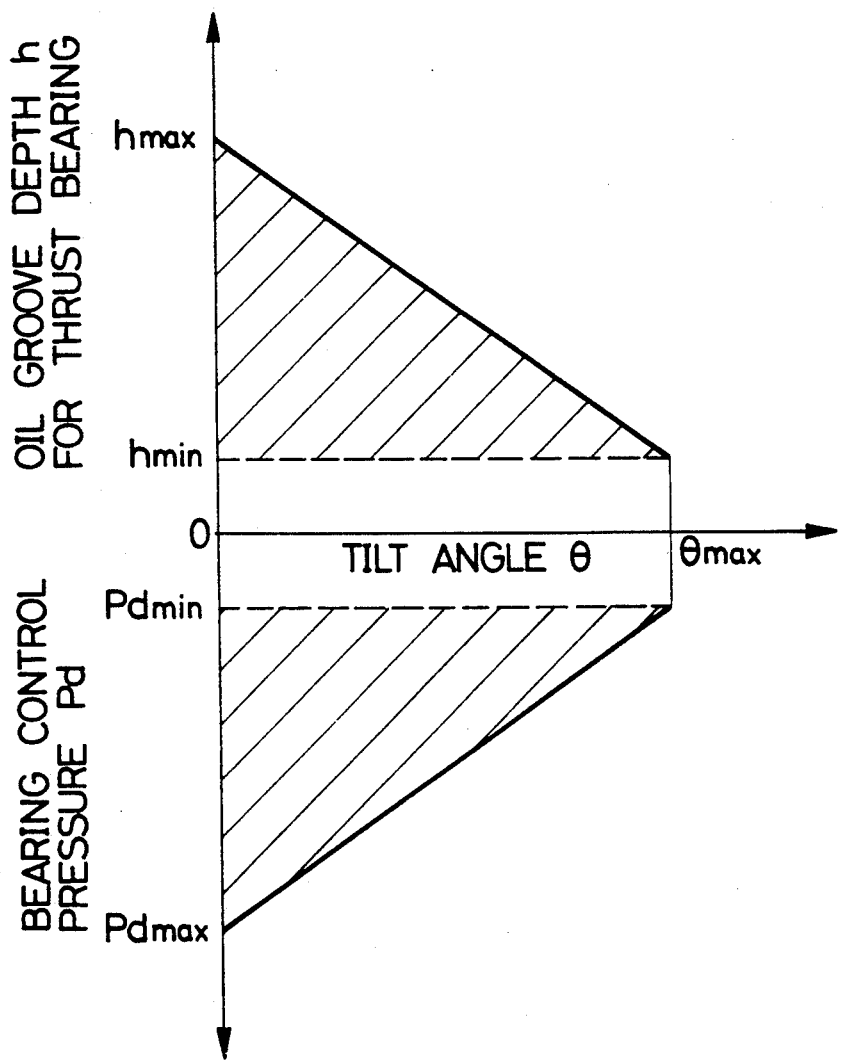
FIG. 9 is a graphical illustration of a relationship of a thrust bearing oil groove depth and bearing control pressure with given tilt angles.
Figure 10:
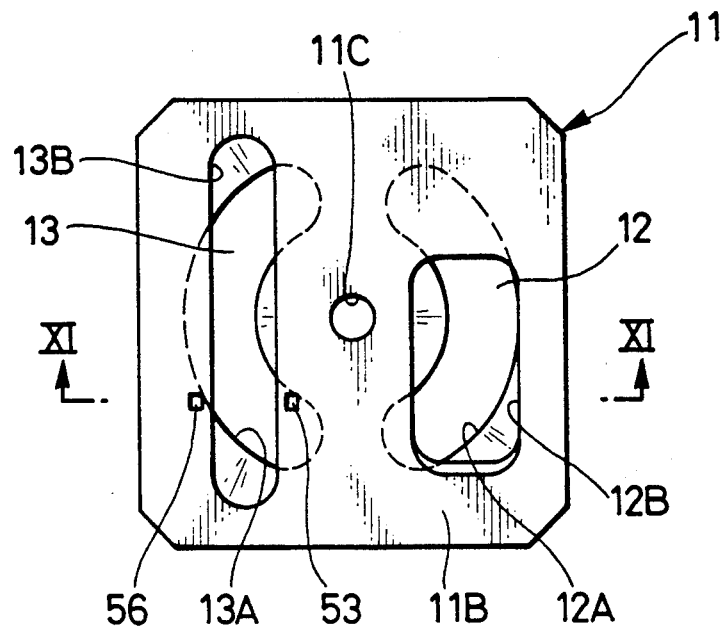
FIG. 10 is a front view of a valve plate of a hydraulic pump in accordance with a second embodiment of the present invention, as viewed from a side of a sliding surface of a head casing.

As shown most clearly in either FIGS. 5 and 9, the oil groove 38 is formed in a wedge-like shape having a continuously varying depth h which becomes the greatest when the tilt angle $\Theta$ of the valve plate 11 is zero or when $\Theta = 0°$ (when the valve plate 11 is in the uppermost position in FIG. 1), and which becomes smallest when the tilt angel $\Theta$ is maximum or when $\Theta = \Theta_{max}$ (the position of FIG. 1). At the shallowest end, the oil groove 38 is provided with a groove portion 38A which communicates with the discharge port opening 13B. The oil hole 39 is formed such that it confronts the lower end (the shallowest end) of the oil groove 38 at the minimum tilt angle, and has an open area which produces a maximum discharge pressure $Pd_{max}$ at the maximum tilt angle. Thus, the variable throttle mechanism 37 for the thrust bearing is arranged to produce a bearing control pressure Pd with characteristics of becoming lower in inverse proportion to the tilt angle $\Theta$. (See FIG. 9.)

An oil passage 40 for the radial bearing control pressure is bored into a thick wall portion of the casing 1 and has one end thereof in communication with the oil hole 36 and the other end in communication with the respective supply ports of the radial hydrostatic bearing 23. An oil passage 41 for the thrust bearing control pressure is bored into a thick wall portion of the casing 1 and has one end thereof in communication with the oil hole 39 and the other end in communication with the respective supply chambers of the thrust hydrostatic bearing 28.

In operation, the valve plate 11 is tilted to the maximum tilted position of FIG. 1 together with the cylinder block 8 by operation of the tilting mechanism 18. For this purpose, the servo piston 21 is displaced by supplying the oil pressure from the auxiliary pump to the oil chamber 20A of the cylinder 19. By so doing, the pivoting pin 22 is displaced together with the servo piston 21, tilting the valve plate 11 under guidance of the tilting slide surface 15. Consequently, the cylinder block 8 is tilted integrally with the center shaft 14 into the position shown in FIG. 1, with its rotational axis inclined relative to the axis of the rotational shaft 5.

The rotational shaft 5 is rotated by an engine, electric motor or other suitable drive source, whereupon the cylinder block 8 is rotated integrally with the rotational shaft 5 since the drive disc 6 of the rotational shaft 5 is connected to the pistons 10 in the respective cylinders 9 of the cylinder block 8. Consequently, the pistons 10 are reciprocated in the respective cylinders 9 during rotation of the cylinder block 8. During the suction stroke when each piston 10 is moved away from the cylinder 9, the operating oil is drawn into the cylinder 9 through the suction port 12 and suction passage 16, and, during the discharge stroke when the piston is moved into the cylinder 9, the operating oil in the cylinder 9 is pressurized and discharged through the discharge port 13 and discharge passage 17.

In this connection, in a bent axis type hydraulic pump of this sort, in proportion to the number of pistons for generating the discharge pressure (e.g., in case the total number of pistons is seven, the maximum number of the pressurizing pistons is four, the minimum number of the pressurizing pistons is three, and the average number of the pressurizing pistons is 3.5), the load of the hydraulic reaction force of the piston and the moment load are exerted on the drive disc 6 in synchronism with the rotational speed of the rotational shaft 5. As shown particularly in FIG. 2, the load F exerted on the drive disc 6 is divided at the support surface of the spherical portion 10A of the piston rod 10 into a radial load or a radial component $F_R$ and a thrust load or an axial component $F_T$ according to the tilt angle $\Theta$. The load composed of the components of two different directions and the moment load are supported by the hydrostatic radial and thrust bearings 23 and 28. Namely, the loads are supported in the radial and axial directions by the hydrostatic and hydrodynamic sliding bearing actions of the static pressures in the pressure chambers 25 and 31 of the hydrostatic bearings 23 and 28.

Now, studying more closely the loads which are exerted on the drive disc in the radial and axial directions, the load F resulting from the hydraulic reaction forces varies in dependence upon the number of pistons and, at the same time, varies with the tilt angle Θ as expressed in equations (1) hereinbefore. More specifically, the radial load $F_R$ becomes smallest when the tilt angle Θ is minimum and becomes greatest when the tilt angle Θ is maximum. On the other hand, the thrust load $F_T$ becomes greatest when the tilt angle Θ is minimum, and becomes smallest when the tilt angel Θ is maximum.

Therefore, according to the present embodiment, the radial bearing control pressure to be supplied to the hydrostatic radial bearing 23 is produced through the variable throttle mechanism 34 for the radial bearing. More specifically, the variable throttle mechanism 34 for the radial bearing employs, on the part of the valve plate 11, the oil groove 35 which becomes deeper at a larger tilt angle Θ and which is in communication with the discharge port 13, and, on the part of the head casing 3, the oil hole 36 which is constantly in communication with the oil groove 35, producing from the oil hole 36 the bearing control pressure Pd which becomes higher at a larger tilt angle Θ, for supply to the hydrostatic radial bearing 23 through the oil passage 40.

Accordingly, when the tilt angle Θ of the cylinder block 8 is intermittently or continuously varied from the minimum tilt angle (Θ=0°) to the maximum tilt angle (Θ=Θ$_{max}$), the bearing control pressure Pd is also elevated in synchronism with the tilt angle Θ. (FIG. 8.) As a result, the static pressure which prevails in the pressure chamber 25 of the hydrostatic radial bearing 24 is correspondingly elevated to the bearing control pressure Pd to securely support the radial load $F_R$ which increases with the tilt angle Θ.

On the other hand, the bearing control pressure to be supplied to the hydrostatic thrust bearing 28 is produced by the variable throttle mechanism 37 for the thrust bearing. More specifically, the variable throttle mechanism 37 for the thrust bearing employs, on the part of the valve plate 11, the oil groove 38 which becomes shallower at a larger tilt angle Θ and which is in communication with the discharge port 13, and, on the part of the head casing 3, the oil hole 39 which is constantly in communication with the oil groove 38, producing from the oil hole 39 the bearing control pressure Pd which becomes lower at a larger tilt angle Θ, for supply to the hydrostatic thrust bearing 28 through the oil passage 41.

Accordingly, when the tilt angle Θ of the cylinder block 8 is intermittently or continuously varied from the minimum tilt angle (Θ=0°) to the maximum tilt angle (Θ=Θ$_{max}$), the bearing control pressure Pd is also lowered in synchronism with the tilt angle Θ. (FIG. 9.) As a result, the static pressure which prevails in the pressure chamber 31 of the hydrostatic thrust bearing 28 is lowered correspondingly to the bearing control pressure Pd to securely support the thrust load $F_T$ which increases with the tilt angle Θ.

Thus, according to the present invention, the depths h of the oil grooves 35 and 38 are automatically determined in correspondence to the tilt angle Θ of the cylinder block 8, so that it is possible to produce the bearing control pressures Pd which corresponds to the respective oil groove depths h. Consequently, the drive disc 6 can be supported stably irrespective of variations in the radial and thrust loads which are imposed on the drive disc 6 by the hydraulic reaction forces according to the tilt angle Θ, while holding the oil leaks from the hydrostatic bearings 23 and 28 to a minimum and reducing vibrations of the rotational shaft 5.

In the embodiment of FIGS. 10-14, an oil groove, serving as a variable throttle mechanism, is provided on the part of the head casing and an oil hole in communication with the discharge port is provided on the part of the valve plate.

More specifically, a variable throttle mechanism 51 for the radial bearing is located on the side of the tilting slide surface 15 of the head casing 3, and includes an oil groove 52 formed along one side of the discharge passage 17, which is opened on the seal land 15B, and extended downwardly in the tilting direction from a median point of the seal land 15B; and an oil hole 53 formed in the sliding contact surface 11B of the valve plate 11 at one side of the discharge port opening 13B opposingly to the oil groove 52.

Figure 11:
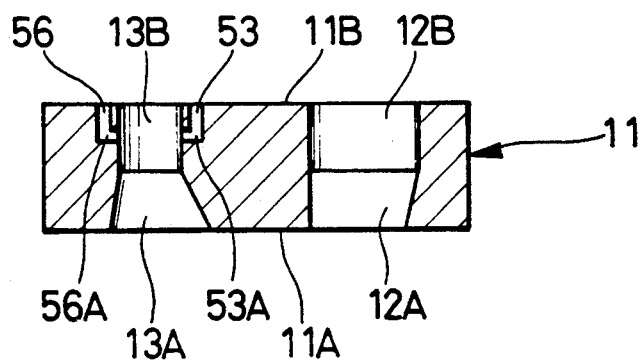
FIG. 11 is a cross-sectional view taken along the line XI—XI in FIG. 10.
Figure 12:
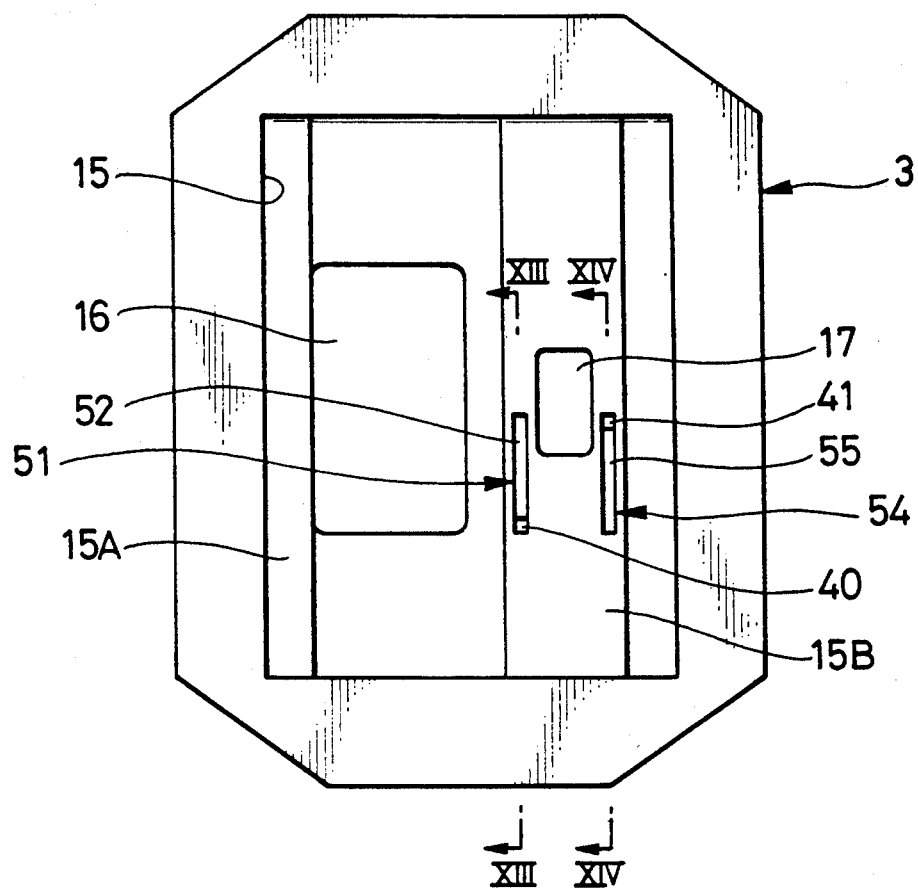
FIG. 12 is a front view of a head casing, taken in a direction of a tilting sliding surface.
Figure 13:
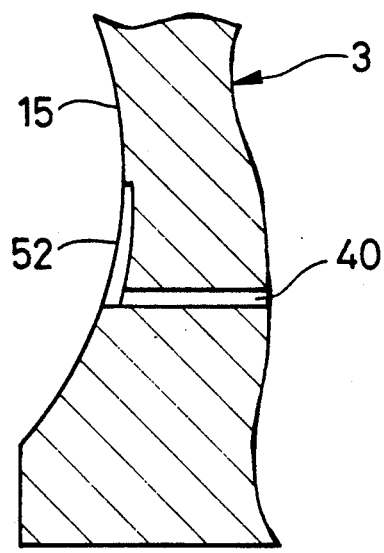
FIG. 13 is a cross sectional view taken along the line XIII—XIII in FIG. 12.

As shown in FIG. 13, the oil groove 52 is in the form of a wedge-shaped groove having a depth h which becomes smallest at the minimum tilt angle (Θ=0°) of the valve plate and becomes greatest at the maximum tilt angle (Θ=Θ$_{max}$), and in communication with the oil passage 40 which is opened at the deepest end of the oil groove 52. On the other hand, as shown in FIG. 11, the oil hole 53 is provided with a communicating passage 53A which is opened into the side wall of the discharge port opening 13B and supplied with part of the discharge pressure.

Thus, as the valve plate 11 is tilted along the tilting slide surface 15 together with the cylinder block 8, the depth h of the oil groove 52 which confronts the oil hole 53 becomes greater correspondingly to the tilt angle Θ. Accordingly, the variable throttle mechanism 51 for the radial bearing is capable of producing a bearing control pressure Pd which has characteristics of increasing in proportion to the tilt angle Θ in the same manner as in the first embodiment.

Further, a variable throttle mechanism 54 for the thrust bearing is located on the side of the tilting slide surface 15 of the head casing 3, and includes an oil groove 55 formed along the other side of the discharge passage 17, which is opened on the seal land 15B, and extended opposingly to the oil groove 52 and downwardly in the tilting direction from a median point of the seal land 15B; and an oil hole 56 formed into the sliding contact surface 11B of the valve plate 11 opposingly to the oil groove 55 at the other side of the discharge port opening 13B away from the oil groove 52.

Figure 14:
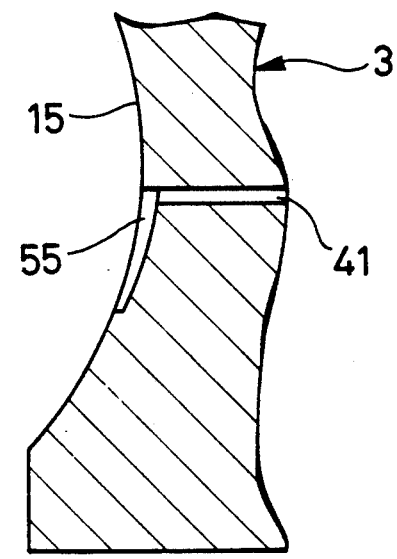
FIG. 14 is a cross-sectional view taken along the line XIV—XIV in FIG. 12.

As shown in FIG. 14, the oil groove 55 is in the form of a wedge-shaped groove having a depth h which becomes greatest at the minimum tilt angle (Θ=0°) of the valve plate 11 and becomes smallest at the maximum tilt angle (Θ=Θ$_{max}$), and in communication with one end of the oil passage 41 which is opened at the deepest end of the oil groove 55. On the other hand, as shown in FIG. 11, the oil hole 56 is provided with a communicating passage 56A which is opened into the side wall of the discharge port opening 13B and is supplied with part of the discharge pressure.

Thus, as the valve plate 11 is tilted along the tilting slide surface 15 together with the cylinder block 8, the depth h of the oil groove 55 which confronts the oil hole 56 becomes correspondingly shallower to the tilt angle Θ. Accordingly, the variable throttle mechanism 54 for the thrust bearing is arranged to produce a bearing control pressure Pd with characteristics of becoming lower in inverse proportion to the tilt angle Θ in the same manner as in the embodiment of FIGS. 1-9.

With the above-described arrangement of FIGS. 10-14, as the cylinder block 8 is tilted, this embodiment can also produce the bearing control pressure Pd of FIG. 8 by the variable throttle mechanism 51 for the radial bearing and the bearing control pressure Pd of FIG. 9 by the variable throttle mechanism 54 for the thrust bearing to give the same effects as in the embodiment of FIGS. 1-9.

In the embodiment of FIGS. 1-9, arrangements are made such that the bearing control pressure is produced by the variable throttle mechanisms 34 for the radial bearing and the variable throttle mechanism 37 for the thrust bearing are fed to the supply port 26 of the hydrostatic radial bearing 23 and the supply chamber of the hydrostatic thrust bearing 28, respectively, through the oil passages 40 and 41 which are formed in the thick wall portion of the casing 1.

Figure 15:
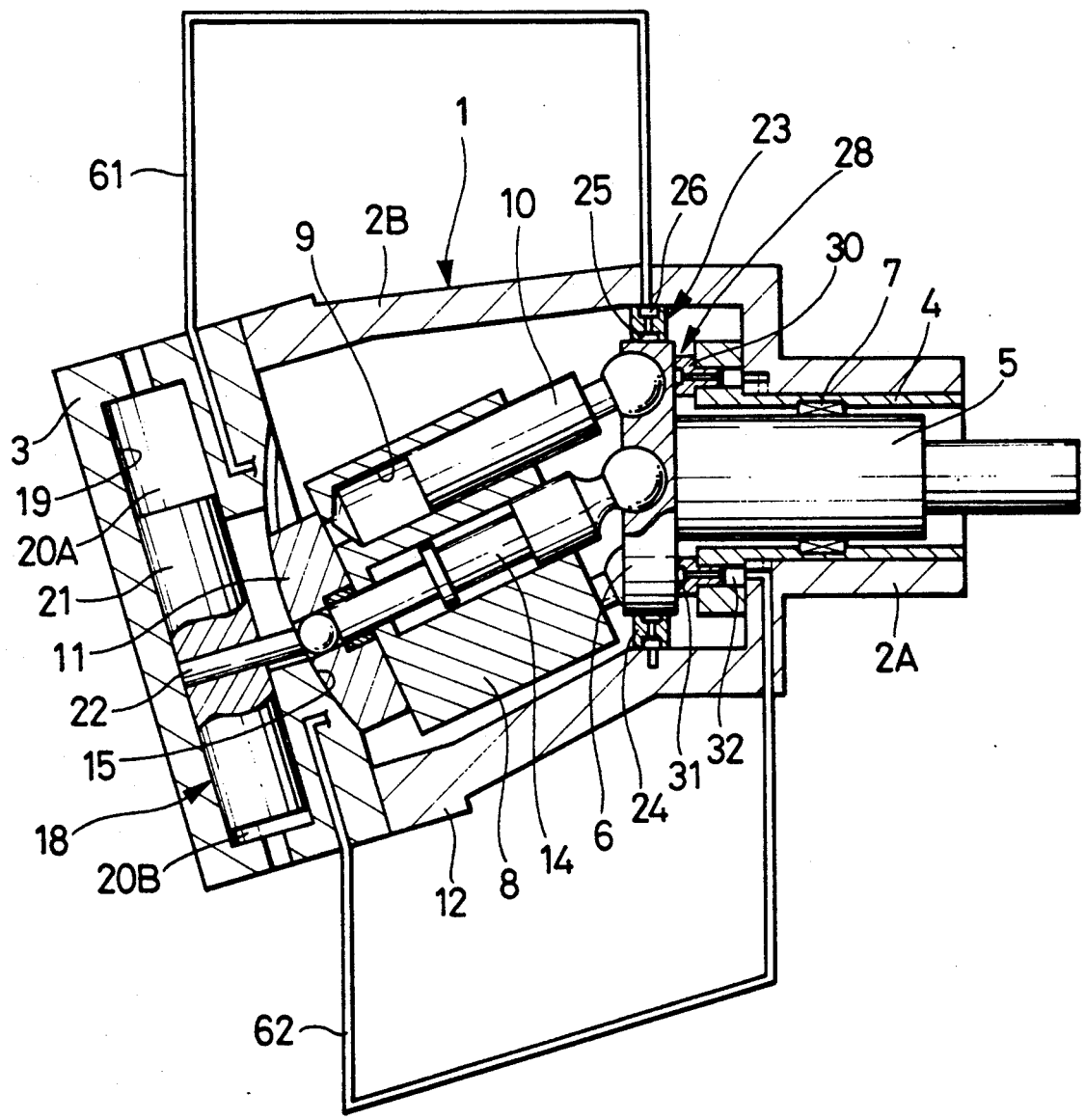
FIG. 15 is a longitudinal cross-sectional view of a hydraulic pump in accordance with a third embodiment of the present invention.

However, in the embodiment of FIG. 15, external conduits 61 and 62 are located on the outer side of the casing 1 and extend for connection between the variable throttle mechanism 34 (53) and the hydrostatic radial bearing 23 and between the variable throttle mechanism 37 (54) and hydrostatic thrust bearing 28, respectively.

The embodiment of FIG. 15 produces the same effects as the embodiment of FIGS. 1-9.

Figure 16:
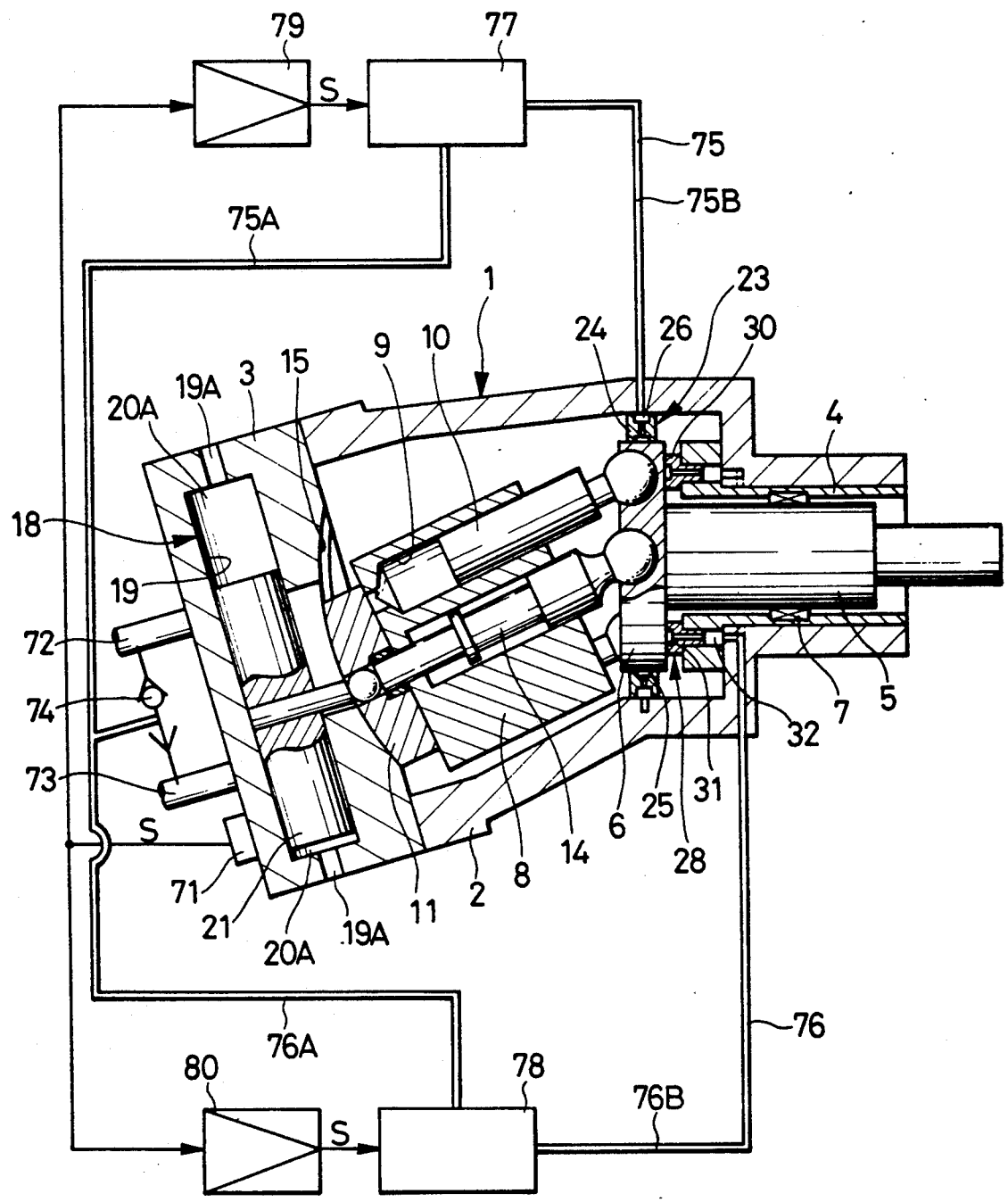
FIG. 16 is a longitudinal cross-sectional view of a hydraulic pump constructed in accordance with a fourth embodiment of the present invention.

A feature of the embodiment of FIG. 16 resides in the arrangements including means for detecting the tilt angle of the cylinder block by the tilting mechanism, and modulating the discharge pressure of the pump, in case of a pump operation, or the supply of pressure of the motor (in case of a motor operation) into bearing control pressures corresponding to the detected tilt angle for supply to the hydrostatic bearings As shown in FIG. 16, a tilt angle sensor 71 is mounted, for example, on the head casing 3 and is adapted to detect the tilt angle $\Theta$ of the cylinder block 8 or valve plate 11 by the tilting mechanism 18 to produce a tilt angle signal S. For this purpose, for example, there may be employed as the tilt angle sensor 71 such a displacement sensor, for example, a potentiometer or differential transformer which detects the tilt angle by way of the sliding displacement of the servo piston 21. Otherwise, as the tilt angle sensor 71, there may be employed a displacement sensor which detects the sliding displacement of the valve plate 11 or a rotational displacement sensor which directly detects the rotational angle of the cylinder block 8 or center shaft 14.

Suction and discharge ducts 72, 73 communicate with the suction and discharge passages 16 and 17, respectively. A shuttle valve 74 is provided between the suction and discharge ducts 72 and 73 to select a higher pressure side.

One external duct 75 is connected between the shuttle valve 74 and the supply port of the hydrostatic radial bearing 23, and another external duct 76 is connected between the shuttle valve 74 and the supply chamber 32 of the hydrostatic thrust bearing 28. An electromagnetic proportional control valve 77 is provided at a suitable position within the length of the external duct 75, dividing the same into an inflow duct 75A and an outflow duct 75B. An electromagnetic proportional reducing valve 78 is provided at a suitable position within the length of the external duct 76, similarly dividing same the into an inflow duct 76A and an outflow duct 76B.

In this instance, the electromagnetic proportional control valve 77 includes an electromagnetic servo valve which increases its output pressure in proportion to the amount of signal For this purpose, the exciting coil of the electromagnetic proportional control valve 77 is connected through an amplifier 79 to the tilt angle sensor 71, which supplies the electromagnetic proportional valve 77 with a tilt angle signal S corresponding to the tilt angle $\Theta$ of the cylinder block 8 to produce the bearing control pressure proportional to the tilt angle sensor S for supply to the hydrostatic radial bearing 23. Namely, the electromagnetic proportional valve 77 serves to modulate the pump discharge pressure from the shuttle valve 74 into the bearing control pressure which corresponds to the tilt angle $\Theta$ for supply to the hydrostatic radial bearing 23 and has the same characteristics as the control pressure shown in FIG. 8.

Further, in this instance, the electromagnetic proportional reducing valve 78 includes an electromagnetic servo valve the output pressure of which becomes lower in inverse proportion to increases in amount of its input signal. For this purpose, the electromagnetic proportional reducing valve 78 is connected through an amplifier 80 to the tilt angle sensor 71, which supplies the reducing valve 78 with a tilt angle signal S corresponding to the tilt angle $\Theta$ of the cylinder block 8 to produce the bearing control pressure varying in inverse proportion to the tilt angle signal S for supply to the hydrostatic thrust bearing 28. Namely, the electromagnetic proportional reducing valve 78 serves to modulate the pump discharge pressure from the shuttle valve 74 into the bearing control pressure which becomes correspondingly lower to the tilt angle $\Theta$ for supply to the hydrostatic thrust bearing 28 and has the same characteristics as the control pressure shown in FIG. 9.

In the embodiment of FIG. 16, as the cylinder block 8 and valve plate 11 are tilted by the tilting mechanism 18, the tilt angle sensor 71 produces a tilt angle signal S corresponding to the tilt angle $\Theta$ of the cylinder block 8. As a result, for supply to the hydrostatic radial bearing 23, the electromagnetic proportional valve 77 produces bearing control pressure Pd which becomes higher in proportion to the amount of the tilt angle signal S. On the other hand, for supply to the hydrostatic thrust bearing 28, the electromagnetic proportional reducing valve 78 produces bearing control pressure Pd which becomes lower in inverse proportion to the tilt angle, signal S.

Thus, the embodiment of FIG. 16 is capable of stably supporting the drive disc 6 in the same manner as the embodiment of FIGS. 1-9, irrespective of variations in the radial and thrust loads of hydraulic reaction forces of pistons, which are exerted on the drive disc 6 according to the tilt angle $\Theta$, while minimizing the oil leaks from the hydrostatic bearings 23 and 23.

Figure 17:
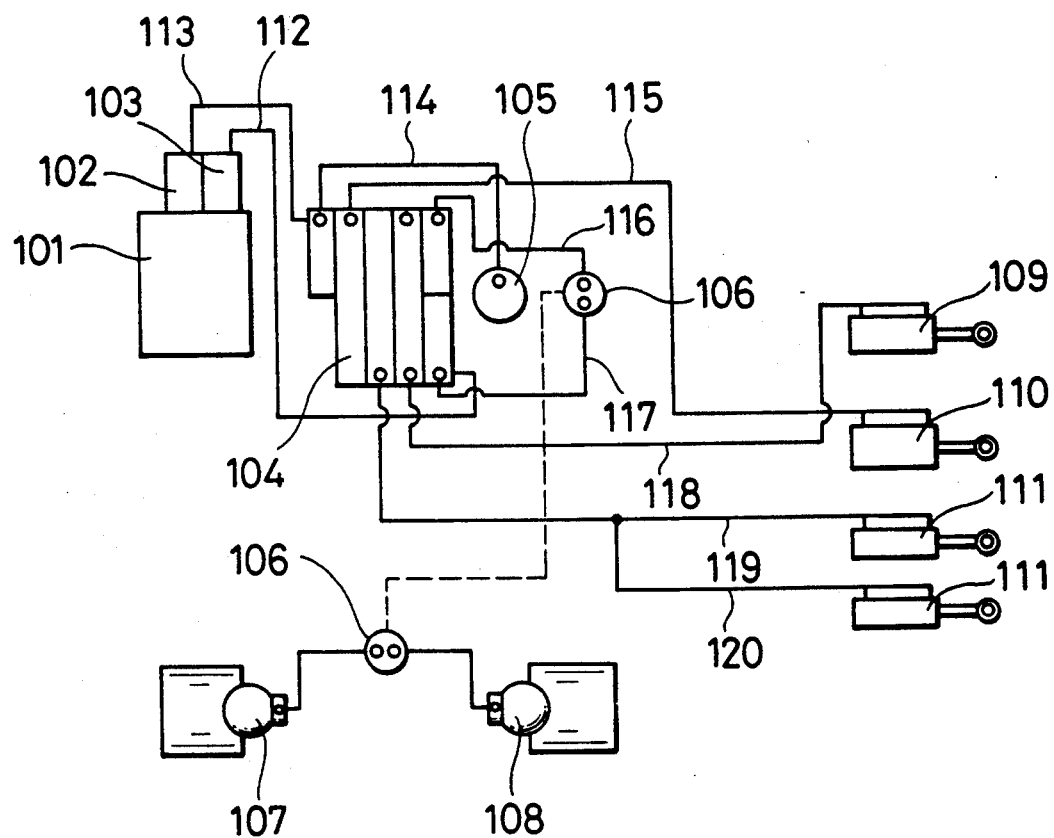
FIG. 17, is a schematic hydraulic circuit diagram of a construction machine to which the present invention is applied.

FIG. 17 provides an example of a hydraulic construction machine such as, for example, a power shovel, which includes an engine 101 serving as a drive source and static pressure-support hydraulic pumps 102, 103 constructed in accordance with the present invention. A group of control valves 104 control the flow directions of the hydraulic power from the pumps 102, 103, with a rotating motor 105 and a center joint 106 being provided for relaying the power from the group of control valves 104. Travelling hydraulic motors 107, 108 are mounted on a lower travelling body, and a bucket operating hydraulic cylinder 109 along an arm operating hydraulic cylinder 110 are provided. A boom operating hydraulic cylinder 111 is provided for the power shovel and conduits 112, 120 interconnect the hydraulic components or elements of the power shovel.

With the construction machine hydraulic system arranged in the above-described manner, the high fluid pressures, discharged from the hydraulic pumps 102, 103 driven from the engine 101, are fed through the control valves 104 to the rotating hydraulic motor 105 which drives the rotating system, the travelling hydraulic motors 107 and 108 which drive the travelling system, or the hydraulic cylinders 109 to 111 for the boom, arm and bucket, to perform an excavating operation.

When the hydraulic pumps 102 and 103 of the above-described construction machine incorporate the hydraulic machine according to the invention, they can operate as hydraulic pumps of high stability and reliability with minimal oil leaks even when the tilt angles of the hydraulic pumps 102, 103 are increased for the purpose of enhancing the travelling and excavating powers for a higher performance. Similar effects can be produced when the invention is applied to the rotating motor 105 or to the travelling hydraulic motors 107, 108.

Figure 18:
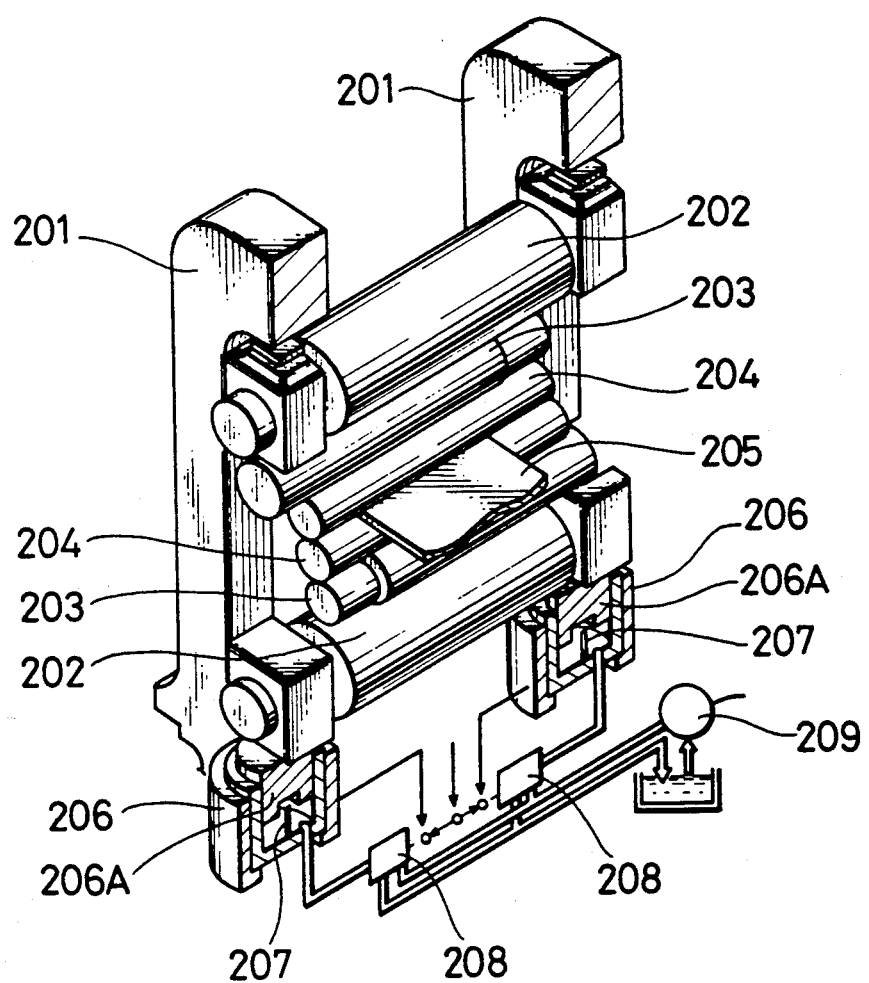
FIG. 18 is a partial cross-sectional view of a hydraulic screw down mechanism of a rolling mill to which the present invention is applied.

As shown in FIG. 18, a hydraulic screw hold down mechanism for a rolling mill includes a mill housing 201, a back-up roll 202, an intermediate roll 203, and a work roll 204 for directly rolling a workpiece 205 into a predetermined thickness. A screw-down cylinder 206 includes a piston 206A for controlling a thickness of the work 205, and a pair of displacement meters 207 detect the position of the piston of the screw down cylinder 206. A pair of force motor valves 208 convert an electric signal based on a screw down, and into a fluid power for controlling a thickness of the workpiece 205, and a static pressure support type hydraulic pump 209 is provided which is constructed in accordance with the present invention.

In a workpiece thickness control system for a hydraulic screw down mechanism of a rolling mill, the positions of the screw down cylinders 206 are adjusted by the force motor valves 208 according to a screw down command to control the thickness of the workpiece between the paired upper and lower work rolls 204 with high precision in the order of microns. When the hydraulic pump 209 of the present invention is applied to a hydraulic system of this sort, it becomes possible to obtain the same effects as explained hereinbefore.

Figure 19:
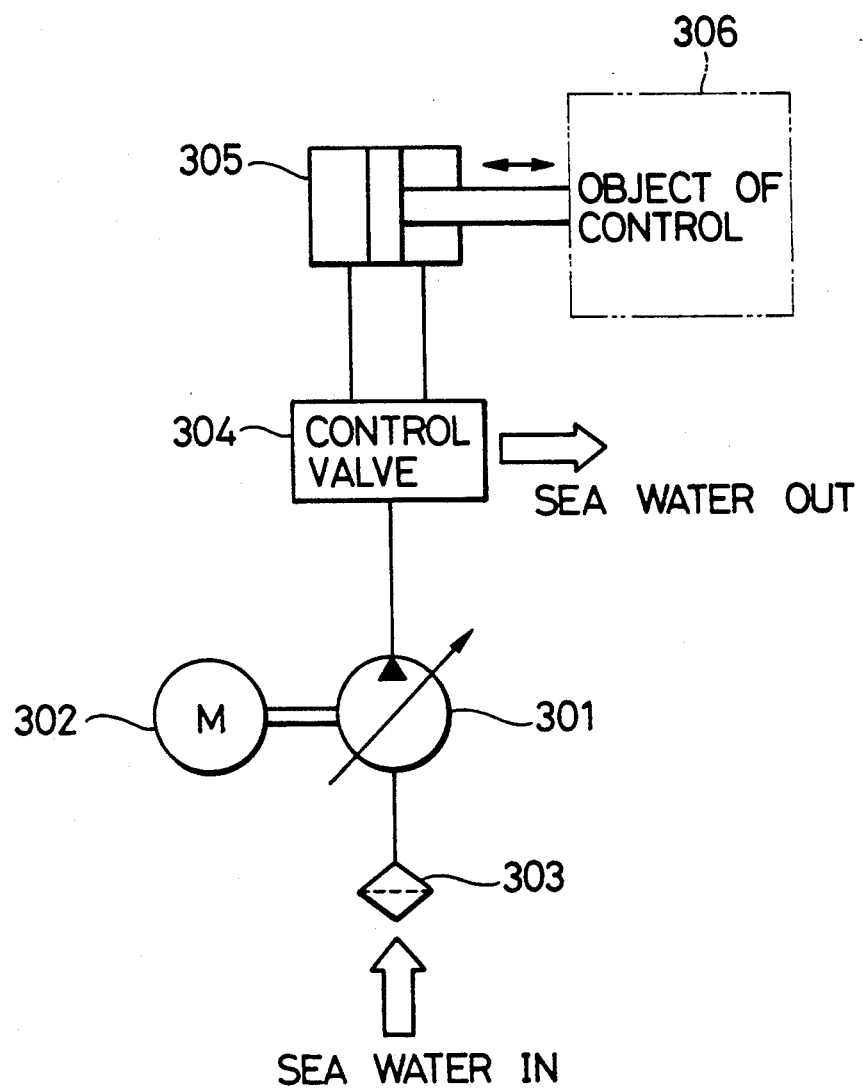
FIG. 19 is a schematic view of a sea water hydraulic system employing the principle of the present invention.

In a sea water hydraulic system incorporating the present invention, as shown in FIG. 19, a total hydrostatic support type hydraulic pump 301 according to the invention utilizes sea water as a pressure medium, with a motor 302 driving the pump 301, a strainer or filter 303, a sea water pressure control valve 304, a sea water-operated actuator 305, and a controlling object driven by the actuator 305 being provided.

In this sea water hydraulic system arrangement, the actuator 305 is driven in the same manner as in an ordinary hydraulic system but the return operating fluid from the sea water pressure control valve 304, namely, used sea water is directly released into the sea.

When the hydraulic machine of the invention is applied as the total hydrostatic support type sea water hydraulic pump 301, the hydrostatic radial and thrust bearings are likewise supplied with its own discharge sea water pressure after modulations according to the tilt angle of the cylinder block, maintaining appropriate surface pressure on the hydrostatic sleeve as well as hydrostatic pads. It follows that, even with a low lubricative operating fluid like sea water, abnormal friction between sliding surfaces of the hydrostatic bearing and drive disc can be suitably prevented. Consequently, it becomes possible to provide a small-sized superhigh-pressure sea water pump with sufficient durability.

Although the invention has been described by way of total hydrostatic support type hydraulic pumps, it is to be understood that the invention can be realized as partial hydrostatic support type machines employing the radial hydrostatic bearing in combination with a mechanical anti-friction bearing (e.g., a roll bearing) in place of the thrust hydrostatic bearing, or employing the hydrostatic thrust bearing in combination with a mechanical antifriction bearing in place of the hydrostatic radial bearing. In short, the present invention is applicable to hydraulic machines which include at least one of the hydrostatic radial and thrust bearings.

In a case where the hydraulic machine of the invention is applied as a reversible hydraulic motor, the paired suction and discharge ports formed in the valve plate as well as the paired suction and discharge passages formed in the head casing become a high pressure port. Therefore, a variable throttle mechanism needs to provide a pair of oil grooves or oil holes in each of the paired suction and discharge ports or passages, taking out a higher pressure by means of a shuttle valve as bearing control pressure for supply to the hydrostatic bearing.

Moreover, although the tilting mechanism 18 has been shown as being provided in the head casing 3 in the foregoing embodiments, it may be substituted by a tilting mechanism which is located on a side wall of the casing body 2 and which is arranged to tilt the cylinder block and valve plate through a yoke having one end supported on a trunnion within the casing.

In addition to the examples of application given above, the hydraulic machine according to the invention is applicable to hydraulic systems of powder molding machines, injection molding machines, high speed forging machines operating in a high temperature environment, tunnel excavating machines and other hydraulically operated machines. Especially in case of an injection molding machine in which the dimensional accuracy of the molded products is influenced by the control of hydraulic pressure, it becomes possible to enhance the accuracy of products by elevating the line pressure from the currently adopted level of about 14.7 MPa to 49 MPa for reducing fluctuations in the injecting pressure to $\frac{1}{3}$ or less.

Even when applied to a hydraulic pump to be used under high pressure conditions, the bearing of the invention can support the rotational shaft in a stable manner.

As described in detail hereinabove, according to the present invention, the bearing control pressure corresponding to the tilt angle of the cylinder block is produced through a variable throttle mechanism and fed to at least a hydrostatic radial or thrust bearing to impart thereto a hydrostatic supporting capacity corresponding to the tilt angle of the cylinder block.

As a result, despite variations in radial or thrust loads of hydraulic reaction forces which are exerted on the drive disc through pistons, the positioning accuracy of the drive disc can be maintained constantly and the rotational shaft can be supported stably at any rotational speed.

The hydrostatic support of the drive disc according to the tilt angle of the cylinder block contributes to hold the leakage from the sliding surface between the drive disc and the hydrostatic bearing to a minimum and constant rate, thereby minimizing power losses. Further, since the hydrostatic bearing is supplied with a bearing control pressure varying according to the tilt angle of the cylinder block, it becomes possible to preclude abnormal frictional wear of the sliding guide surface of the hydrostatic bearing and to prevent deterioration in durability even if used under high pressure conditions for a long period of time, permitting continuous operations over long time periods.

What is claimed is:

1. In a bent axis type variable displacement hydraulic machine including:

a cylindrical casing having a head casing with suction and discharge passages;

a rotational shaft rotatably inserted into said casing and having a drive disc at the distal end thereof disposed in said casing; a cylinder block located in said casing and having a plurality of axial cylinder bores;

a plurality of pistons reciprocably received in said cylinder bores in said cylinder block and each pivotally supported at one end by said drive disc; a valve plate having a suction port and a discharge port and formed with a switching surface on one end face in sliding contact with said cylinder block and a sliding surface on another end face in tilting sliding contact with a tilting slide surface on said cylinder block; a tilting mechanism for tilting said valve plate together with said cylinder block; and hydrostatic bearing means provided between said drive disc and casing and forming a radial hydrostatic bearing and thrust hydrostatic bearing to support a radial load and a thrust load, respectively, exerted on said drive disc by hydraulic reaction forces;

a variable throttle means provided between said head casing and valve plate and adapted to produce a first pressurized fluid and a second pressurized fluid modulated in correspondence with a tilt angle of said cylinder block for supply of said first pressurized fluid at a first pressure and in a first manner to said radial hydrostatic bearing and to supply said second pressurized fluid at a second pressure and in a second manner to said thrust hydrostatic bearing.

2. A bent axis type variable displacement hydraulic machine as defined in claim 1, wherein said hydraulic machine is applied as a pump of main hydraulic pressure source or a drive motor in a hydraulic system of construction machine.

3. A bent axis type variable displacement hydraulic machine as defined in claim 1, wherein said hydraulic machine is applied as a main pump in a hydraulic system for a screw down mechanism of rolling mill.

4. A bent axis type variable displacement hydraulic machine as defined in claim 1, wherein said hydraulic machine is applied as a pump of main hydraulic pressure source in a sea water hydraulic system.

5. A bent axis type variable displacement hydraulic machine comprising: a cylindrical casing having a head casing with suction and discharge passages; a rotational shaft rotatably inserted into said casing and having a drive disc at the distal end thereof disposed in said casing;

a cylinder block located in said casing and having a plurality of axial cylinder bores;

a plurality of pistons reciprocably received in said cylinder bores in said cylinder block and each pivotally supported at one end by said drive disc;

a valve plate having a suction port and a discharge port and formed with a switching surface on one end face in sliding contact with said cylinder block and a sliding surface on another end face in tilting sliding contact with a tilting slide surface on said cylinder block;

a tilting mechanism for tilting said valve plate together with said cylinder block;

hydrostatic bearing means provided between said drive disc and casing as a radial hydrostatic bearing and a thrust hydrostatic bearing to support a radial load and a thrust load, respectively, exerted on said drive disc by hydraulic reaction forces;

a variable throttle means provided between said head casing and valve plate and adapted to produce a first pressurized fluid and a second pressurized fluid modulated in correspondence with a tilt angle of said cylinder block for supply of said first pressurized fluid at a first pressure and in a first manner to said radial hydrostatic bearing and to supply said second pressurized fluid at a second pressure and in a second manner to said thrust hydrostatic bearing, wherein said variable throttle means comprises an oil groove provided on said sliding surface of said valve plate along and in communication with one of the suction and discharge ports, whichever is on the high pressure side and having a depth increasing with a tilt angle of said valve plate, and an oil hole provided on said tilting slide surface of said head casing at a position confronting said oil groove, said oil hold, drawing out said first pressure increasing with the tilt angle of said valve plate for supplying the first pressure to said radial hydrostatic bearing.

6. A bent axis type variable displacement hydraulic machine, comprising: a cylindrical casing having a head casing with suction and discharge passages; a rotational shaft rotatably inserted into said casing and having a drive disc at the distal end thereof disposed in said casing;

a cylinder block located in said casing and having a plurality of axial cylinder bores; a plurality of pistons reciprocably received in said cylinder bores in said cylinder block and each pivotally supported at one end by said drive disc;

a valve plate having a suction port and a discharge port and formed with a switching surface on one end face in sliding contact with said cylinder block and a sliding surface on another end face in tilting sliding contact with a tilting slide surface on said cylinder block;

a tilting mechanism for tilting said valve plate together with said cylinder block;

hydrostatic bearing means provided between said drive disc and casing as a radial hydrostatic bearing and thrust hydrostatic bearing to support as a radial load and a thrust load, respectively, exerted on said drive disc by hydraulic reaction forces;

a variable throttle means provided between said head casing and valve plate and adapted to produce a first pressure and a second pressure modulated in correspondence with a tilt angle of said cylinder block for supply of a first pressurized fluid at said first pressure and in a first manner to said radial hydrostatic bearing and to supply a second pressurized fluid at said second pressure and in a second manner to said thrust hydrostatic bearing, wherein said variable throttle means comprises an oil groove provided on said sliding surface of said valve plate along and in communication with one of the suction port and the discharge port whichever is on the high pressure side and having a depth decreasing correspondingly to increase in a tilt angle of said valve plate, and an oil hole provided on said tilting slide surface of said head casing at a position confronting said oil groove, said oil hold, drawing out hole said second pressure decreasing in inverse proportion to the tilt angle of said valve plate for supplying the second pressure to said thrust hydrostatic bearing.

7. A bent axis type variable displacement hydraulic machine as defined in claims 5 or 6, wherein said oil groove formed on said valve plate is communicated with said port on the higher pressure side at the deepest end thereof.

8. A bent axis type variable displacement hydraulic machine comprising: a cylindrical casing having a head casing with suction and discharge passages; a rotational shaft rotatably inserted into said casing and having a drive disc at the distal end thereof disposed in said casing;

a cylinder block located in said casing and having a plurality of axial cylinder bores;

a plurality of pistons reciprocably received in said cylinder bores in said cylinder block and each pivotally supported at one end by said drive disc;

a valve plate having a suction port and a discharge port and formed with a switching surface on one end face in sliding contact with said cylinder block and a sliding surface on another end face in tilting sliding contact with a tilting slide surface on said cylinder block; a tilting mechanism for tilting said valve plate together with said cylinder block;

hydrostatic bearing means provided between said drive disc and casing as a radial hydrostatic bearing and thrust hydrostatic bearing to support a radial load and a thrust load, respectively, exerted on said drive disc by hydraulic reaction forces;

a variable throttle means provided between said head casing and valve plate and adapted to produce a first pressure and a second pressure modulated in correspondence to a tilt angle of said cylinder block for supply of a first pressurized fluid at said first pressure and in a first manner to said radial hydrostatic bearing and for supply of a second pressurized fluid at said second pressure and in a second manner to said thrust hydrostatic bearing, wherein said variable throttle means comprises an oil groove provided on said tilting slide surface of said head casing along and in communication with one of the suction port and the discharge port whichever is on the high pressure side and having a depth increasing with an tilt angle of said valve plate, and an oil hole provided on said sliding surface of said valve plate at a position confronting said oil groove and in communication with one of the suction port and the discharge port whichever is on the high pressure, side, said oil groove drawing out said first pressure increasing with the tilt angle of said valve plate for supply of said first pressurized fluid to said radial hydrostatic bearing.

9. A bent axis type variable displacement hydraulic machine comprising: a cylindrical casing having a head casing with suction and discharge passages; a rotational shaft rotatably inserted into said casing and having a drive disc at the distal end thereof disposed in said casing;

a cylinder block located in said casing and having a plurality of axial cylinder bores;

a plurality of pistons reciprocably received in said cylinder bores in said cylinder block and each pivotally supported at one end by said drive disc;

a valve plate having a suction port and a discharge port and formed with a switching surface on one end face in sliding contact with said cylinder block and a sliding surface on another end face tiltably in sliding contact with a tilting slide surface on said cylinder block;

a tilting mechanism for tilting said valve plate together with said cylinder block; and hydrostatic bearing means provided between said drive disc and casing as a radial hydrostatic bearing and a thrust hydrostatic bearing to support a radial load and a thrust load, respectively, exerted on said drive disc by hydraulic reaction forces, comprising:

a variable throttle means provided between said head casing and valve plate and adapted to produce a first pressure and a second pressure modulated in correspondence to the tilt angle of said cylinder block for supply a first pressurized fluid at said first pressure and in a first manner to said radial hydrostatic bearing and to supply a second pressurized fluid at said second pressure and in a second manner to said thrust hydrostatic bearing, wherein said variable throttle means comprises an oil groove provided on said tilting slide surface of said head casing along and in communication with one of the suction port and the discharge port whichever is one the high pressure side and having a depth decreasing correspondingly to increase in a tilt angle of said valve plate, and an oil hole provided on said sliding surface of said valve plate at a position confronting said oil groove and in communication with one of the suction port and the discharge port whichever is on the high pressure side, said oil groove drawing out said second pressure decreasing in inverse proportion to the tilt angle of said valve plate for supply of the second pressurized fluid to said thrust hydrostatic bearing.

10. A bent axis type variable displacement hydraulic machine as defined in claims 8 or 9, wherein said oil groove formed on said head casing is provided with an oil passage at the deepest end thereof for drawing out said bearing control pressure.

* * * * *